E. F. PAWSAT.
TANDEM SEAT FOR MOTOR CYCLES OR THE LIKE.
APPLICATION FILED APR. 5, 1915.
1,158,551. Patented Nov. 2, 1915.
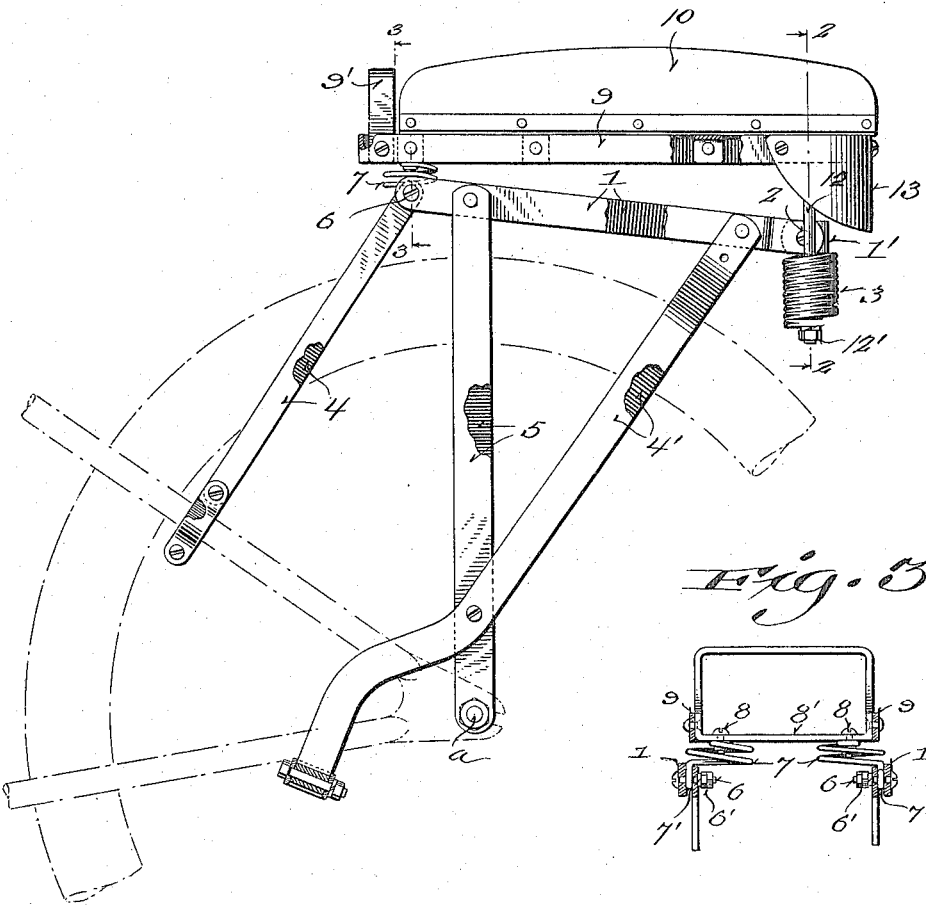
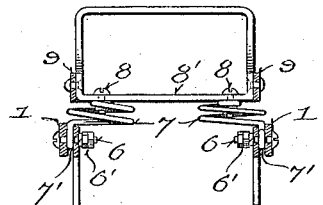

UNITED STATES PATENT OFFICE.

EWALD F. PAWSAT, OF SHEBOYGAN, WISCONSIN, ASSIGNOR TO WALD MANUFACTURING COMPANY, OF SHEBOYGAN, WISCONSIN.

TANDEM SEAT FOR MOTOR-CYCLES OR THE LIKE.

1,158,551.   Specification of Letters Patent.   Patented Nov. 2, 1915.

Application filed April 5, 1915. Serial No. 19,262.

*To all whom it may concern:*

Be it known that I, EWALD F. PAWSAT, a citizen of the United States, and resident of Sheboygan, in the county of Sheboygan and State of Wisconsin, have invented certain new and useful Improvements in Tandem Seats for Motor-Cycles or the like; and I do hereby declare that the following is a full, clear, and exact description thereof.

My invention has for its object to provide a simple, economical and conveniently arranged detachable tandem seat for motor-cycles, bicycles or the like.

Specific objects are to provide an apron for a spring-supported seat, the apron being adapted to incase the gap at the rear end of the seat, which gap occurs between the seat frame and load frame. To provide a simple spring connection between the rear portion of the seat frame and load frame, which spring connection is also partly concealed by the apron, whereby clothing of the rider is more or less protected from being damaged that would otherwise inadvertently be caught between the fixed member and the movable member of the seat.

A further object of my invention is to provide a spring hinge connection between the front portion of the seat frame and load frame.

With the above and other minor objects in view the invention consists in what is herein shown, described and claimed.

In the drawings Figure 1 represents a side elevation of a seat embodying the features of my invention, with parts broken away and in section to show certain details of construction; Fig. 2, a cross-section through the rear portion of the seat, the section being indicated by line 2—2 of Fig. 1, and Fig. 3, a similar cross-section through the front portion of the seat illustrating its spring hinge or floating connection with the load frame.

Referring by characters to the drawings, 1 represents the side-rails of a load frame, which rails are connected at their rear ends by a reach-bar 1', the same being secured to the rails by clamping bolts 2 and their associated nuts 2', which bolts also serve as hangers for the upper ends of depending coiled springs 3, the said upper ends of the coiled springs being interposed between inturned ends of the reach-bar and rail ends, whereby the several parts are firmly clamped together. The rails are provided with front and rear legs 4, 4', and vertically disposed brace-bars 5, which brace-bars are connected to the lower ends of the legs 4' and are adapted to be secured to the axle *a* of the vehicle wheel, as indicated in dotted lines. The front pair of legs 4 are clipped to the frame of said vehicle in any suitable manner, it being understood that the rails, legs and braces which together constitute a load-supporting frame, form no part of my present invention. The forward ends of the load-supporting frame rails 1 are connected to the legs 4 by bolts 6 and their associated nuts 6'. Interposed between the legs 4 and rails 1 are the eyed ends 7' of coiled springs 7, which eyes surround the bolts and are tightly clamped between the several frame members. These coiled springs are extended inwardly from the load frame members whereby they are protected and the upper ends of said springs are secured by bolts 8 to a transverse brace bar 8' that forms part of a rectangular seat-supporting skeleton frame 9, there being several of such brace-bars connecting the side members of the seat frame throughout its length for the support of a cushion 10.

The rear portion of the outer member of the seat frame is slightly rounded and connected forwardly of its rounded end by a cross-brace 8'', which cross-brace is, in this instance, formed in two parts laid one upon the other. One section of the cross-brace is provided with turned down ears which are riveted to the outer seat-frame member and the two parts of the brace are secured by the shouldered riveted ends 11 of depending vertically disposed load-supporting thrust rods 12. The lower ends of the thrust-rods project upon a plane a distance from the reach-bar 1' of the load carrying frame, which reach-bar and the rear portion of the seat-supporting frame are spaced apart a considerable distance, whereby the latter frame has clearance to rise or fall under load strain. The lower ends of the thrust-rods have threaded thereon pairs of nuts 12', between which the lower looped end of the extension springs 3 are clamped, the said lower ends being fitted about the thrust-rods. By this connection a certain amount of adjustment may be had whereby the seat can be slightly raised or lowered by running the nuts up or down with respect to their threaded engagement with the ends of the rods. Thus it will be seen that the springs 3 are entirely below the load-sustaining frame and the naked rods projecting above the same, although of ample strength, to appearances form a delicate connection between the parts and from a manufacturing standpoint it is desirable to conceal such delicate construction whereby the parts appear substantial to those unskilled in the art. A further objectionable feature desired to be overcome by my invention is that the gap between the seat frame and the load frame at the rear forms an unobstructed opening whereby parties using the saddle may be inadvertently injured by placing their hands thereunder or the clothing may be caught between these parts and injured.

As shown in Figs. 1 and 2 of the drawings, the objectionable features are overcome by attaching an apron 13 to the rear portion of the seat-frame, which apron may be of metal or leather or any other suitable material. The apron, as shown, extends below the plane of the load frame to close up the gap between it and the seat frame at all times and incidentally the upper portion of the thrust-rods which support the load. This apron can be formed in any artistic design and is designed to be utilized also as a name-plate, whereby the owner may readily identify his vehicle. The forward end of the seat frame 9 is also provided with a bail 9′ which is pivoted to said frame for the convenience of the rider and attention is also directed to the fact that the apron 13 will prevent clothing being caught between the coils of the spring when said spring is distended.

I claim:

1. A seat comprising a load-supporting frame having side-rails, a seat-frame, short coiled sections of hinged springs connecting the forward end of the seat-frame and corresponding end of the load frame, thrust-rods rigidly secured to the rear portion of the seat-frame, coiled springs surrounding the lower ends of the rods, means for securing the lower ends of the coiled springs to the rod ends, and bolts for securing the upper ends of said coiled springs to the load frame.

2. A seat comprising a load-supporting frame having side rails, bolts mounted in the front ends of the side rails, coiled springs having ends secured to the bolts, a seat-frame above the rails, means for securing the upper ends of the coiled spring sections to the seat frame, whereby a yielding hinge joint connection is had between said frames, thrust-rods rigidly secured to the seat-frame and extending below the rear portion of the load frame, and coiled springs connecting the ends of the thrust-rods and said load frame.

3. A seat comprising a load-supporting frame having side rails, and a seat-supporting frame in pivotal union with the forward end of the side rails, bolts extending through the rear ends of the load frame, a reach-bar supported by the bolts, coiled springs having eyed upper ends fitted between the ends of the reach-bar and side rails engageable with the bolts, thrust-rods rigidly secured to the rear end of the seat frame and extending through the coiled springs, the thrust-rods being provided with threads at their lower ends, eyed terminals extending from the lower ends of the springs engageable with the rods, and adjusting nuts mounted upon the threaded ends of said rods for clamping the spring eyes.

In testimony that I claim the foregoing I have hereunto set my hand at Sheboygan, in the county of Sheboygan and State of Wisconsin, in the presence of two witnesses.

EWALD F. PAWSAT.

Witnesses:
WM. H. GRUBE,
ARTHUR A. NACK.

Copies of this patent may be obtained for five cents each, by addressing the "Commissioner of Patents, Washington, D. C."